FIG. 1.

HERBERT W. THORNBURG,
INVENTOR.

BY John Adams Thuring
ATTORNEY.

Jan. 20, 1959　　H. W. THORNBURG　　2,869,826
ROTARY WELL DRILL FEED
Filed Aug. 14, 1953　　7 Sheets-Sheet 3

HERBERT W. THORNBURG,
INVENTOR.

BY *John Adams Thornburg*
ATTORNEY.

Jan. 20, 1959 H. W. THORNBURG 2,869,826
ROTARY WELL DRILL FEED
Filed Aug. 14, 1953 7 Sheets-Sheet 4

HERBERT W. THORNBURG,
INVENTOR.

BY *John A. Adams Thering*

ATTORNEY.

Jan. 20, 1959    H. W. THORNBURG    2,869,826
ROTARY WELL DRILL FEED
Filed Aug. 14, 1953    7 Sheets-Sheet 5

HERBERT W. THORNBURG,
INVENTOR.

BY John Adams Thiery
ATTORNEY.

HERBERT W. THORNBURG,
INVENTOR.

BY
ATTORNEY.

Jan. 20, 1959  H. W. THORNBURG  2,869,826
ROTARY WELL DRILL FEED
Filed Aug. 14, 1953  7 Sheets-Sheet 7

HERBERT W. THORNBURG,
INVENTOR.

BY *[signature]*
ATTORNEY.

ated Jan. 20, 1959

United States Patent Office 2,869,826

2,869,826
ROTARY WELL DRILL FEED

Herbert W. Thornburg, South Milwaukee, Wis., assignor to Bucyrus-Erie Company, South Milwaukee, Wis., a corporation of Delaware Application August 14, 1953, Serial No. 374,364

5 Claims. (Cl. 255—22)

This invention relates to well-drilling equipment, and more particularly to new and useful improvements in a feed mechanism for rotary-type blast-hole drills.

The principal objects of the invention are to provide an improved well-drilling apparatus in which:

(1) The drill string can be held back by means responsive to lowering speed of the drill string.

(2) The downward force on the drill string is imposed by means having selectively either a high or a low force-speed ratio.

(3) The rotary drive power means for the drill string travels with and adds its weight to the drill string.

(4) A uniform cut is achieved by the drill bit without back-up or bouncing of the tool.

In addition to the principal objects, above stated, a number of novel and useful details have been worked out which will be readily evident as the description progresses.

The invention consists in the novel parts and in the combination and arrangement thereof, which are defined in the appended claims, and of which one embodiment is exemplified in the accompanying drawings, which are hereinafter particularly described and explained.

Figure 1:
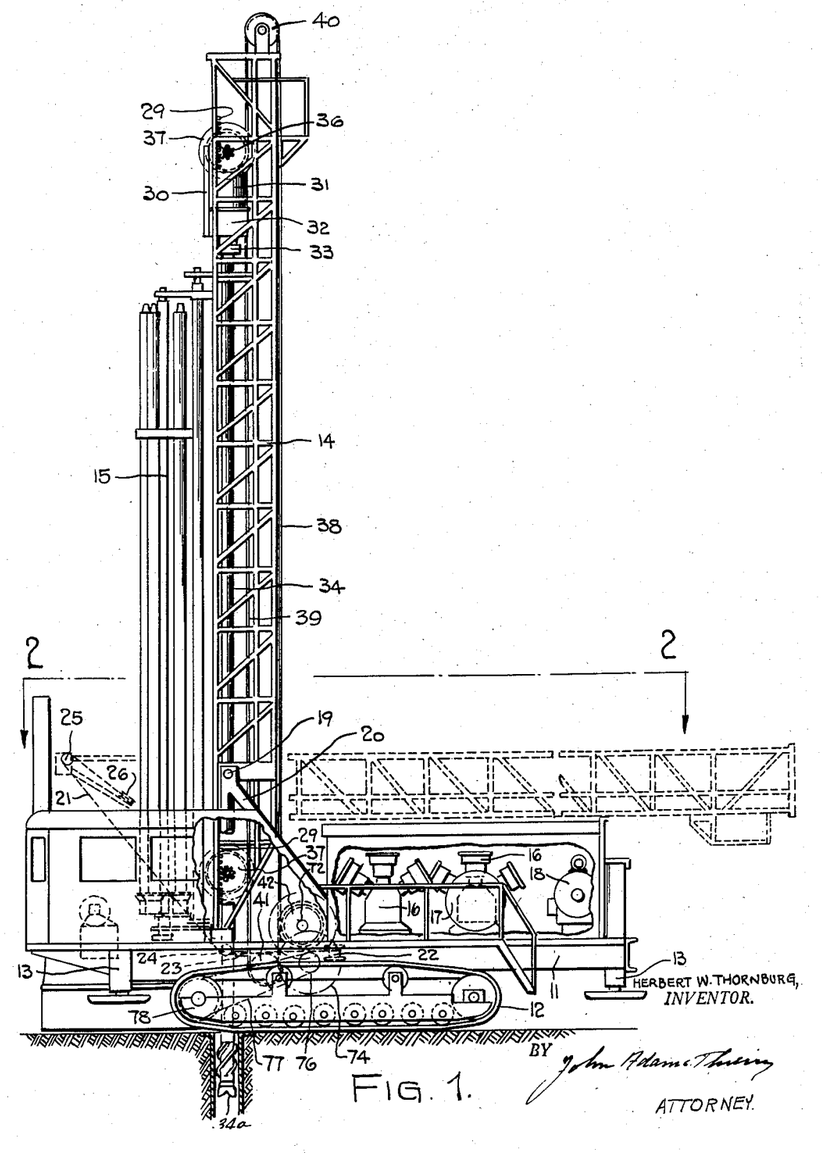
Figure 1 is a side elevation of a rotary blast-hole drill embodying the invention.
Figure 2:
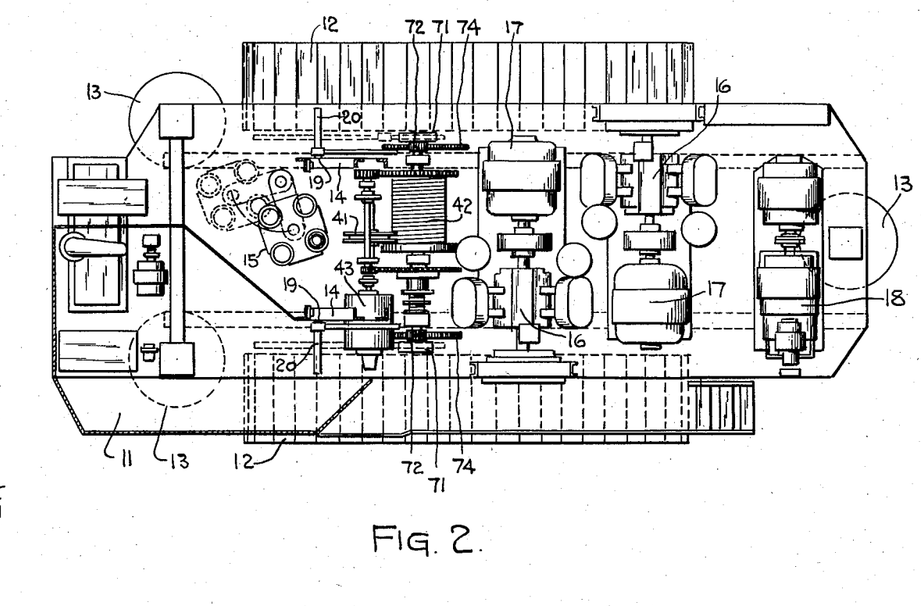
Figure 2 is an enlarged horizontal section taken along the line 2—2 of Figure 1, showing the lower main frame and main machinery of the drill.

Turning now to Figures 1 and 2, it is seen that the rotary blast-hole drilling apparatus that is the illustrative embodiment of the invention, comprises a horizontal mobile base 11, preferably mounted on crawlers 12 and three hydraulic levelling jacks 13, which supports a derrick 14, tool-handling unit 15, air-compressors 16, compressor motors 17, motor generator set 18 and the main machinery (hereinafter described) for hoisting the derrick, raising and lowering the drill string together with its rotary-drive mechanism, handling drill pipe, and propelling the machine. The drill string 34 includes at its lower end a rotary drill bit 34a.

Derrick 14 is a one-piece unit that is pivotally mounted at 19 on A-frame 20 on base 11, so that it can be lowered from its normal vertical operating position to a horizontal travelling position (shown by broken lines in Figure 1). The derrick is raised and lowered by means of hoist cable 21 which runs (see Figures 5 and 6) from power-driven derrick hoist drum 22 on base 11 to and about guide sheaves 23 and 24 on base 11, thence about sheaves 25 and 26 located adjacent the lower end of the derrick and thence about guide sheave 27 to a dead-end 28 on base 11.

Vertical gear racks 29 rigidly mounted on the derrick provide tracks for vertical traverse frame 30 (see Figures 7 and 9) on which is mounted the rotary-drive unit for the drill-tool string. This rotary-drive unit consists of a generator fed controlled D. C. electric motor 31, an enclosed gear-case 32 containing gearing (hereinafter described) to connect the motor-drive shaft to the drive coupling 33 at the top of the drill-string 34. Horizontal shipper-shaft 35, rotatably mounted at the upper end of frame 30, is keyed to pinions 36, which engage the gear racks 29 on the derrick, and is connected to the shipper-shaft drum 37 through an automatic-brake mechanism (hereinafter described). The vertical traverse frame 30 and the rotary drive and shipper-shaft machinery is raised and lowered on racks 29 by means of hoist cable 38 and pull-down cable 39 which are reeved (see Figures 3 and 4) from the shipper-shaft drum 37 about upper and lower fleeting sheaves 40 and 41 respectively at the upper and lower ends of the derrick, to the bull-reel drum 42 mounted on base 11. Rotating the bull-reel drum 42 in one direction (clockwise in Figures 1 and 4) pulls the vertical traverse frame 30 down, and rotating the bull-reel drum 42 in the opposite direction (counterclockwise in Figures 1 and 4) raises the vertical traverse frame 30 and hoists the drill string 34. The reeving and detailed operation of the hoist and pull-down cables and their associated apparatus will be described hereinafter in further detail.

Turning now more particularly to Figures 1, 2 and 12–14, it is seen that the main machinery on base 11 is driven by main hoist and propel motor 43 which has a generator fed control and is supplied with power and controlled by motor generator set 18. The drive shaft of motor 43 is connected by flexible coupling 37 to one end of the main drive shaft 45 to which is splined propel pinion 46 which meshes with propel gear 47 keyed to the propel and bull-reel shaft 48. Therefore, whenever the motor 43 turns, the shaft 48 turns.

On the other end of main drive shaft 45 is rotatably mounted bull-reel pinion shaft 49 and bull-reel pinion 50 integral therewith which rotates about the axis of drive shaft 45 and engages the bull-reel gear 51. Drive shaft 45 and pinion shaft 49 are drivably connected at will by jaw clutch 53. Therefore, when motor 43 turns and clutch 53 is engaged, the bull-reel drum 42, which is keyed to its gear 51, turns to hoist or lower the frame 30.

Figure 12:
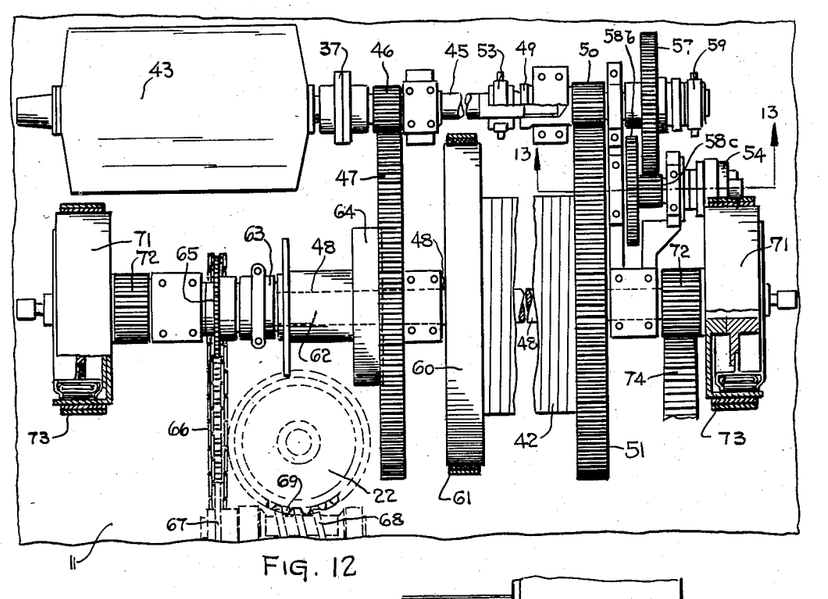
Figure 12 is an enlarged plan view, partially in section, showing the main machinery for tool pull-down, derrick hoist, and propel.
Figures 13, 14:
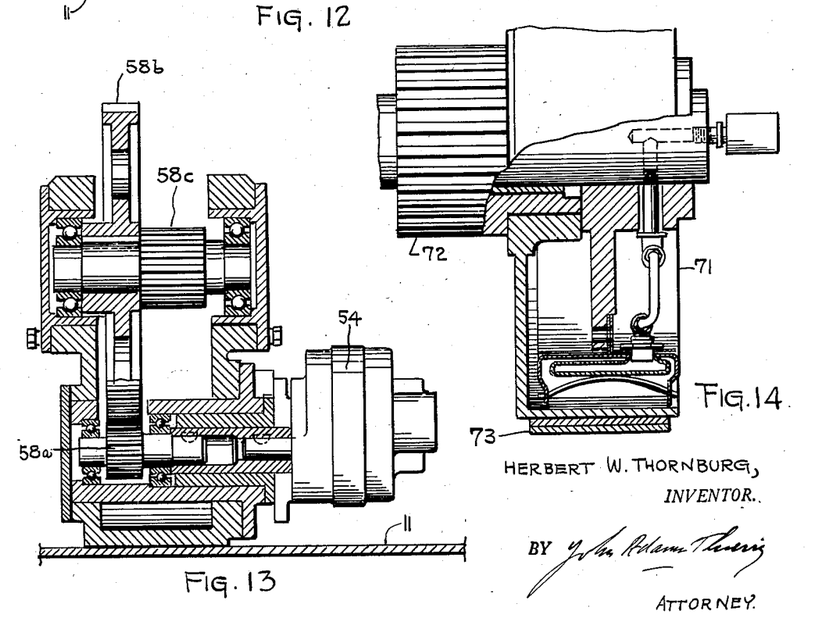
Figure 13 is a vertical section, taken along the line 13—13 of Figure 12, showing the fluid pull-down motor and reduction-drive mechanism.
Figure 14 is an enlarged plan view, partly in section of the propel clutch and brake.

The bull-reel drum 42 may also be driven to pull down frame 30 by the following described alternative mechanism. Fluid motor 54 drives pull-down gear 57, rotatably mounted on the end of bull-reel pinion shaft 49, preferably through double-gear reduction gears 58a, 58b, and 58c (Figures 12 and 13). A second jaw-clutch 59 connects gear 57 to pinion shaft 49 so that when the fluid motor 54 is actuated to turn and jaw-clutch 59 is engaged and jaw-clutch 53 is disengaged, the fluid motor 54 will drive the bull-reel drum 42, through pinion 50 and bull-reel gear 51.

Thus the bull-reel drum 42 may at will be driven alternatively at slow speed with high torque by the fluid motor 54 which has a relatively-high force-speed ratio or at higher speed with low torque by the electric motor 43 which has a relatively-low force-speed ratio.

At the end of bull-reel drum 42 adjacent propel gear 47, is rigidly mounted bull-reel brake housing 60 for an external contracting-type brake band 61 for the drum. This brake is mechanically controlled by conventional means not shown. Therefore, either the brake 60—61 or the electric motor 43 can be used to brake the lowering of the drill tools.

An auxiliary-reel drum 62 is also mounted for rotation on and about propel shaft 48. This auxiliary-reel drum 62 is located adjacent propel gear 47, is drivably connected to drive shaft 48 by means of jaw-clutch 63, and is braked by a conventional band-type brake 64. This auxiliary drum is used for erecting machinery, handling pipe, braking bit joints, and numerous other jobs.

The jaw-clutch 63 that engages the auxiliary drum 62 is also used to engage derrick-hoist sprocket 65 to the driveshaft 48. Sprocket 65 is drivably connected by chain 66 to sprocket 67 that is integral with worm-gear 68 that drives gear 69 on derrick-hoist drum 22. Therefore, when the motor 43 turns the drum-shaft 48 and clutch 63 is engaged with sprocket 65, the derrick-hoist drum 22 will turn to raise or lower the derrick.

At each end of the propel and bull-reel shaft 48, there is an air-operated clutch 71 with attached pinion 72 that rotates about the axis of the drum shaft. A conventional outside band-type brake 73, also air-operated, engages the periphery of the housing of each clutch 71. Each pinion 72 drives a propel gear 74 located integral with sprocket 76 (Figure 1). Propel chain 77 drivably connects sprocket 76 to the tumbler-drive sprocket 78 of the adjacent crawler 12 (see Figure 1). Thus it is seen that each crawler is individually driven and steered by its adjacent clutch and brake 71 and 73 respectively.

Figures 3, 4, 5, 6:
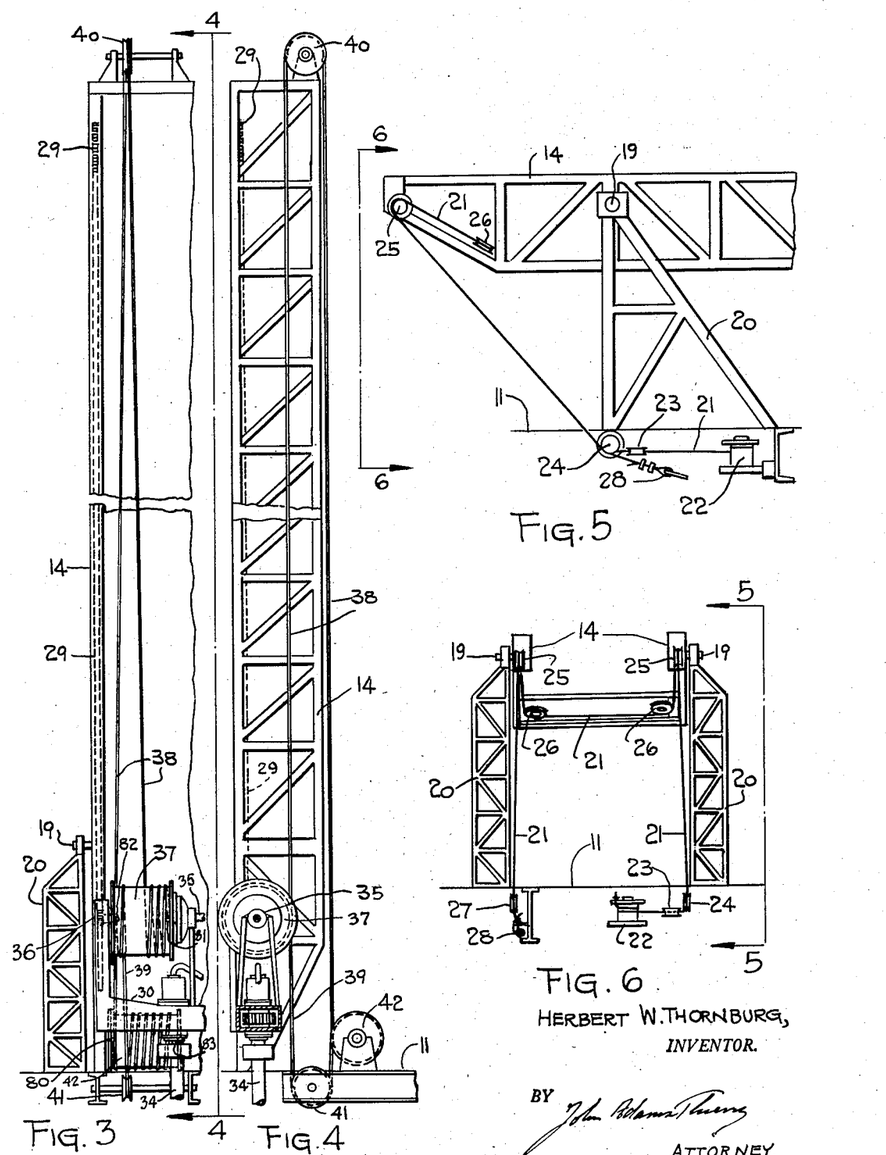
Figure 3 is a partial schematic end view of the derrick showing the hoist and pull-down reeving for raising and lowering the rotary drive unit on the derrick.
Figure 4 is a side elevation taken along the line 4—4 of Figure 3.
Figure 5 is an enlarged side elevation of the derrick and the derrick hoist reeving, with the derrick in horizontal travelling position.
Figure 6 is an end view of the derrick and the derrick hoist reeving, taken along the line 6—6 of Figure 5.

Turning now to Figures 3 and 4, the bull-reel drum 42 and the shipper-shaft drum 37 are drivably connected with vertical traverse frame 30 by the following-described reeving to hoist and pull down the vertical traverse frame 30 on derrick 14. Two cables 38 and 39 are used in this reeving scheme, one cable 38 for hoisting and the other cable 39 for pull-down. With the shipper-shaft drum 37 in lowered position, as shown in Figures 3 and 4, the hoist cable 38 is anchored at one end 80 of the bull-reel drum 42 and one-half wrap is put around the drum. The cable 38 is then reeved over the upper fleeting sheave 40 located at the top of the derrick and then brought down to the shipper-shaft drum 37 in its lowered position. An appropriate number of wraps (sufficient to hoist the frame 30 to the top of the derrick) are then put on the shipper-shaft drum 37 and the cable 38 is then anchored at the end 81 on the drum 37. The pull-down cable 39 is anchored at 82 on the opposite end of the shipper-shaft drum 37 and one wrap is put around the drum in the opposite direction to the hoist cable 38. The pull-down cable 39 is then brought down around the lower fleeting sheave 41 at the base of the derrick and reeved around the bull-reel drum 42 in the opposite direction to the hoist cable 38. An appropriate number of wraps of cable 39 (sufficient to permit hoisting frame 30 to the top of the derrick) are put on the bull-reel drum 42 and the pull-down cable 39 is then anchored at 83 on the opposite end of drum 42. Therefore, as the bull-reel drum 42 turns in one direction, the shipper-shaft drum 37 and frame 30 is raised, and as it turns in the opposite direction the shipper-shaft drum 37 and frame 26 is pulled down.

The above-described hoist and pull-down reeving provides a positive and continuous downward pull as well as upward hoist on the drill string 34 (shown in Figure 1). Furthermore, since the horizontal axis of the shipper-shaft drum 37 lies in the same vertical plane as the drill-tool stem, the pull-down is applied centrally to the drill string, thereby avoiding the excessive strains that would result from an eccentric pull-down.

Figures 7, 8, 9:
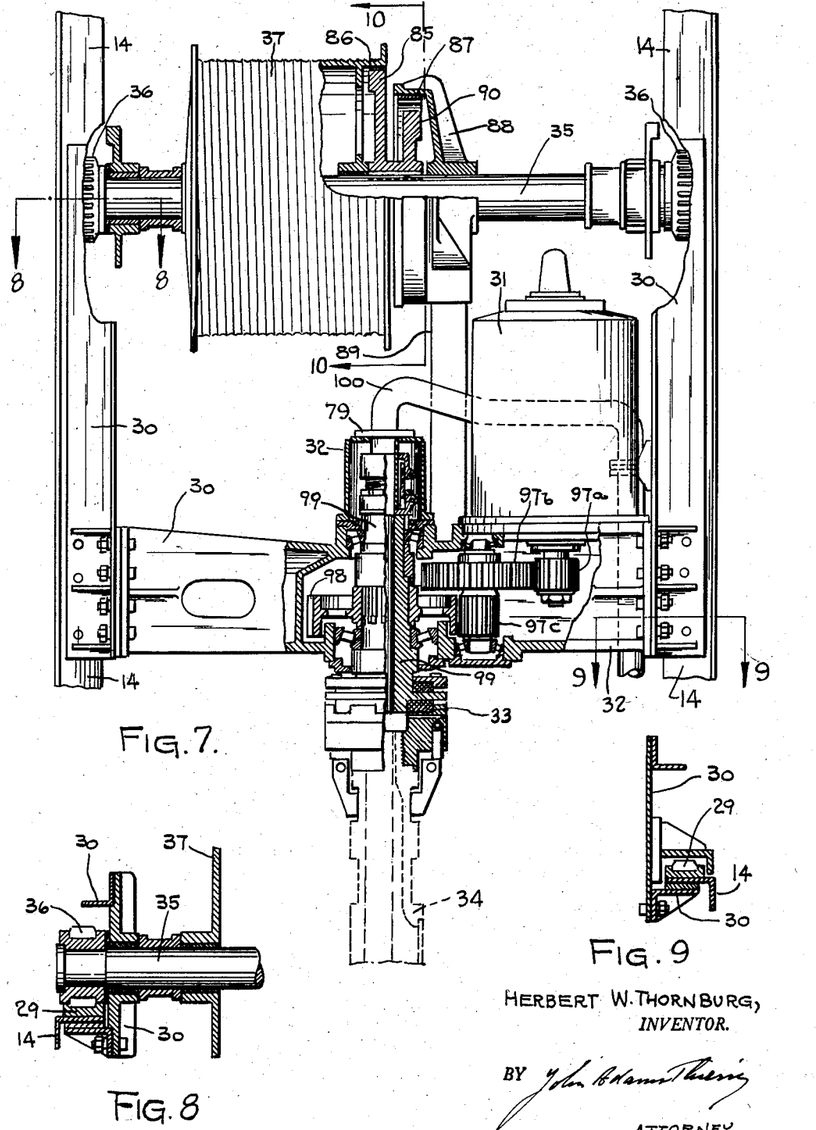
Figure 7 is an enlarged end view of the vertical traverse frame and the rotary driving unit.
Figure 8 is a horizontal section, taken along the line 8—8 of Figure 7, showing the gear and rack connection between the vertical traverse frame and the derrick.
Figure 9 is a horizontal section, taken along the line 9—9 of Figure 7, showing the sliding connection between the lower end of the vertical traverse frame and the derrick.

Turning now to Figures 7 to 9, it is seen that not only the shipper-shaft drum 37, but also the rotary drive electric motor 31 and the rotary drive unit that connects the motor to and drives the drill string, are mounted in vertical traverse frame 30 that runs on gear racks 29 and travels with the drill string. Thus it is seen that a large mass, in the form of the frame 30 and the heavy equipment mounted on it, is added to the mass of the drill string and is available to react against and prevent tendency of the drill bit to back-up or bounce, without cutting, in the hole as the bit rotates. Such backing-up or bouncing is to be avoided not only because the bit does not cut or at best cuts unevenly when it is backing up, but also because bouncing up and down of the drill string is a violent action and may wreck the machine if it is allowed to continue.

Back-up of the drill string is further diminished or prevented during normal drilling by the manner in which the pull-down force of cable 39 is applied to the drill string 34 through shipper-shaft drum 37, pinions 36, and frame 30. Use of the large-diameter drum 37 and relatively small-diameter pinion 36 provides a large mechanical advantage whereby the pull-down force applied by cable 39 is multiplied several times when it acts on the drill string 34 through frame 30.

Figure 10:
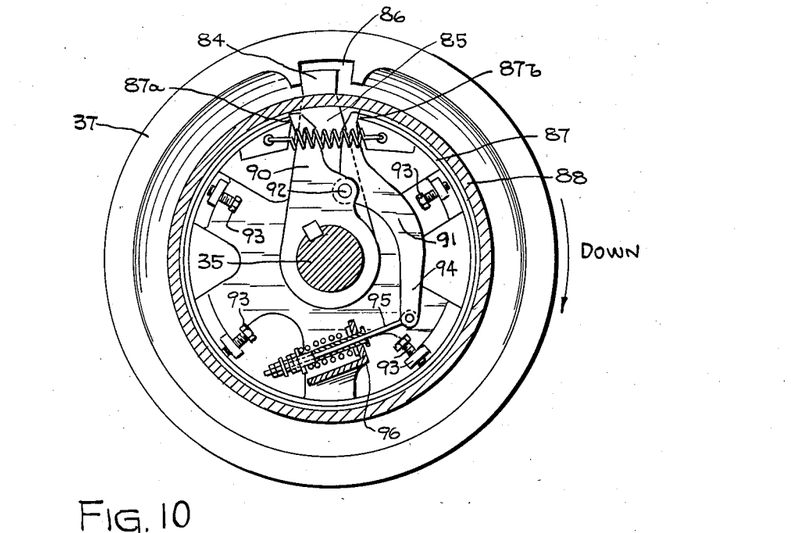
Figure 10 is a vertical section, taken along the line 10—10 of Figure 7, showing the brake mechanism of the shipper-shaft drum in set position.
Figure 11:
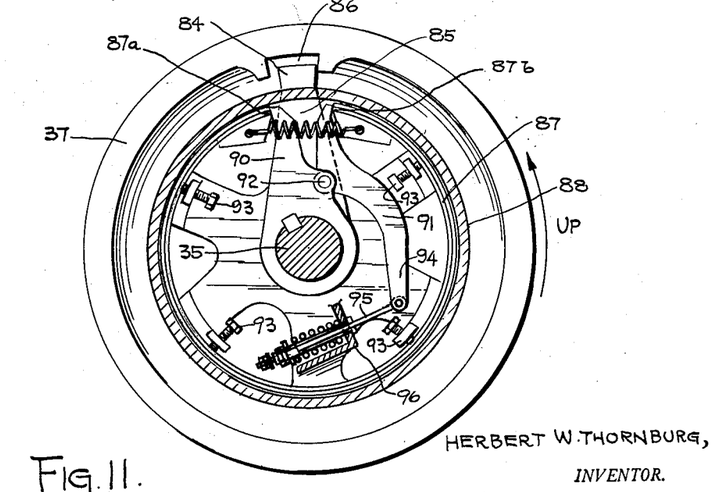
Figure 11 is a vertical section, similar to Figure 10, showing said brake mechanism in unset position.

Turning now to Figures 10 and 11, as well as to 7, it is seen that another device for preventing bouncing of the drill bit is the following-described automatic brake on the shipper-shaft drum 37. Drum 37 is rotatably mounted on shipper-shaft 35, but free rotation of shaft 35 is limited by the amount that the head 84 of driver 85 can travel about shaft 35, to which it is keyed, within internal peripheral notch 86 on the housing of drum 37. Even such limited movement is restricted by internal expanding one-way brake band 87 which is mounted on drum 37 and frictionally engages the inner face of brake housing 88 rigidly mounted by support 89 on frame 30. Brake band 87 is actuated by arm 90 of driver 85, the outer end of which engages one end 87a of the brake band, and by bell-crank 91 which is pivotally mounted at 92 on arm 90 of driver 85 and engages the other end 87b of the brake band. Set screws 93 mounted on drum 37 maintain uniform contact of band 87 against brake housing 88. Arm 94 of bell-crank 91 is actuated by drum 37 through reach-rod 95 which is biased by lug 96 on drum 37 to release the brake band when the drum rotates counter-clockwise (Figure 11), as during hoisting, and to set the brake band when the drum rotates clockwise (Figure 10), as during pull-down.

Turning now to Figures 3 and 10, it is seen that during pull-down of the drill string, with pull-down cable 38 in tension and actuating drum 37 to rotate clockwise, there will not only be positive driving engagement between the drum 37 and shaft 35 through driver 84, but brake band 87 will be set due to the fact that the drilling reaction on shaft 35 causes arm 90 of driver 85 to set one end 87a of band 87 and the opposite rotation of drum 37 and its lug 96 causes bell-crank 91 to set the other end 87b of band 87. If the drill bit starts to back-up, such movement is resisted not only by the drum 37 and cable 39, but even more positively by the automatic setting of brake band 87 which in effect locks the shaft 35 to the derrick 14.

Turning to Figures 3 and 11, it is seen that when the drum is rotated counterclockwise, as in hoisting, the brake band 87 is automatically released due to the relative clockwise movement of driver 85 and its arm 90 away from end 87a of the band 87, and to the counterclockwise movement of arm 90 on drum 37 which rotates bell-crank 91 counterclockwise and releases the other end 87b of the brake band. This frees the shaft 35 to rotate on the derrick. Driving engagement between shaft 35 and drum 37, necessary to hoist frame 30, is obtained through driver 85 when it makes contact with the opposite end of notch 86 on drum 37.

Turning now to Figure 7, it is seen that the lower portion of frame 30 carries the rotary drive machinery for the drill string and the coupling which provides not only a rotary drive connection, but also a supporting connection, to the drill string so that the drill string can be raised and lowered as well as rotated. Reversible electric motor 31 is drivably connected, through reduction gears 97a, 97b, and 97c, to gear 98 which is splined to shaft 99 of rotary drive unit 32. The lower end of shaft 99 is connected by flexible drive coupling 33 to the upper end of the drill string. A pressure fluid conduit 100 is connected to a stuffing box 79 on the top of the gear case of rotary drive unit 32 to supply compressed air (or other pressure fluid) from a source to the hollow core of drill string 34.

Figure 15:
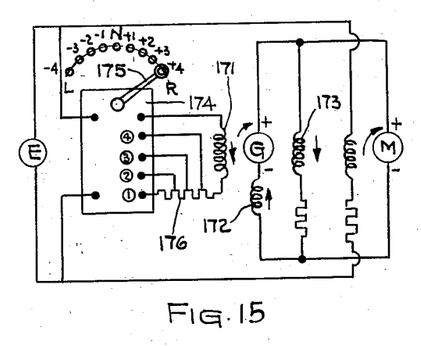
Figure 15 is a schematic circuit diagram showing the electrical control means for the main machinery and pull-down electric motor, with arrows indicating the directions of flux when the motor is hoisting the drill tool.
Figure 16:
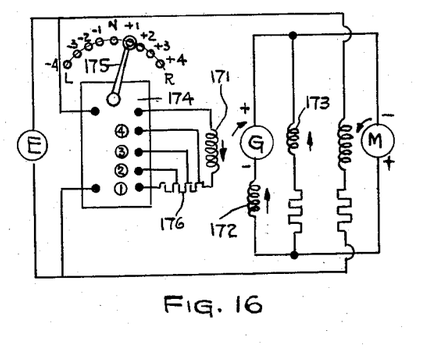
Figure 16 is a schematic circuit diagram similar to Figure 15, but showing the directions of flux when the motor is holding back downward movement of the drill tool.
Figure 17:
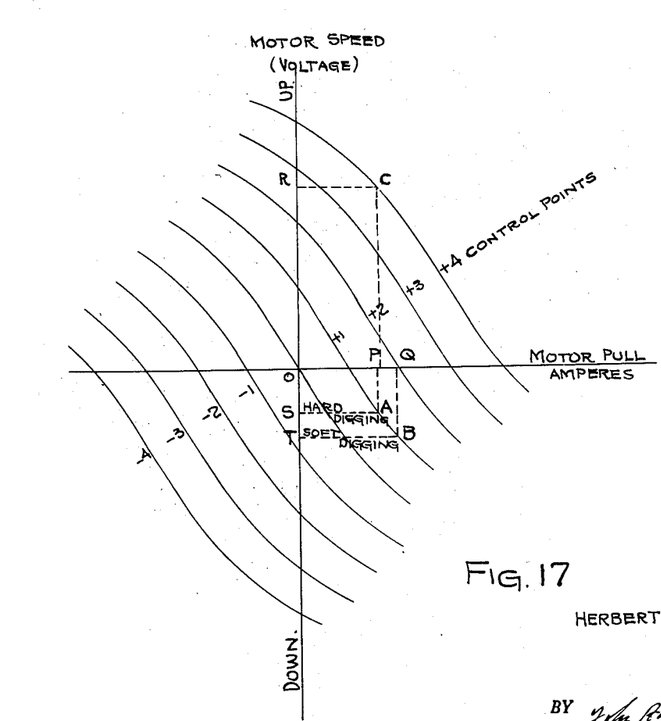
Figure 17 is a graphical representation of the motor pull-speed (ampere-voltage) characteristic curves, showing the effect on motor pull (or holdback) of an increase in reverse speed of the motor when the drill tool strikes soft digging.

Turning now to Figures 15 to 17, it is seen that the main hoist motor 43 (designated "M" in Figures 15 and 16) has a generator-fed electric motor control system which consists of a main generator 18 (designated "G" in Figures 15 and 16) and its associated windings and control. Generator G is excited by separate field winding 171 and includes in its secondary circuit series field winding 172 and shunt self-field winding 173. Current from low-voltage D. C. source E to winding 171 is manually controlled by a conventional reversing controller 174, the control handle 175 of which has a plurality of settings, say four, corresponding to a series of taps off of resistor 176 in the primary circuit of generator G. These control points are numbered from 1 to 4 on each side of neutral (zero pull) and in that order represent points for obtaining progressively greater excitation generator current and, therefore, progressively greater motor speed and pull for both hoisting (positive excitation) and lowering (negative excitation). The motor speeds obtained for various degrees of motor pull or load are shown in Figure 17 by a family of speed-pull (voltage-ampere) motor characteristic curves, each curve representing one setting of the controller 174.

When the controller is set at position "+4" (see Figure 15), in order to hoist the drill string 34 and frame 30, the required motor pull will be equal to say OP in Figure 17 so that the operating point on the "+4" characteristic curve in Figure 17 will be at point C and motor speed will equal OR. If now, the drill string is allowed to drop or is moving downward in digging, the weight of the drill string and rotary drive machinery on frame 30 will be so great that, even with the controller set to hoist in position "+1," nevertheless the weight of the drill string and machinery will overcome the upward motor pull and the motor will rotate in reverse and the drill string will drop, the reverse motor speed being indicated by OS in Figure 17 and the operating point by A on the "+1" characteristic curve. Then the motor M can be used to hold back the drill string during digging. If, during digging a soft spot is reached so that the downward speed of the drill string and motor increases, then the hold-back pull of the motor will automatically increase in response to such increase in speed, the new operating point being say at B on the "+1" characteristic curve of Figure 17.

In Figures 15 and 16 the directions of the flux in the windings 171, 172 and 173 are shown for the controller 174 set for positive hoist, the controller on the one hand (Figure 15) being set at position "+4" to provide sufficient excitation current to hoist the drill string, and on the other hand (Figure 16) at position "+1" to hold back the drill string when it is moving downward under its dead weight. It will be noted that the effect of reversing the direction of movement of the motor M, without reversing the controller, is to reverse the direction of the shunt self-field 173, without affecting the direction of the series-field 172 or the separate excitation field 171. Accordingly, although the motor is travelling in a reverse direction, namely downward instead of upward, a net upward pull of the motor is maintained, the amount of such pull being shown, for a given setting of the controller, by the characteristic curve in Figure 17.

The above-described control system for the motor M provides a flexible control of the drill string that is not possible with conventional systems. Thus, when operating in reasonably-hard material, which requires very little pull-down on the drill string, the controller 174 can be set at position "−1" for pull-down on the drill string just sufficient to give the proper drilling speed. In other types of material the one-point pull-down is too much and will cause the drilling operation to become overloaded. In this case, the controller 174 can be set in neutral position, producing no pull-down, or, if overloading still continues, the controller 174 can be set in "+1" hoisting, to produce a low hoisting pull on the drill string just sufficient to hold back or retard the gravity action of the tool load.

If the drilling becomes comparatively hard, then the low-speed high-torque fluid pull-down motor 54 can be used instead of, or in addition to, the electric pull-down motor 43 (M). The use of motor 54 to add its force to motor 43 (M) for heavy pull-down is referred to hereinafter as operation of said motors in tandem.

Thus it is seen, that the supplementary use of the low-speed high-torque pull-down motor 54 and the electric pull-down and hoist motor 43 (M) results in a wide range of control of the drill string from slightly holding back to a comparatively heavy pull-down.

Having now described one embodiment of the invention, it is to be understood that the invention is not to be limited to the specific form or arrangement of parts herein described and shown.

I claim:

1. In a rotary well-drilling apparatus the combination of: a ground-supported base; a derrick supported by said base; a rotary drill bit adapted to rotate about its vertical axis; a vertical traverse frame; means supporting said vertical traverse frame on said derrick for vertical movement relative thereto; raising and lowering means operatively connected to said vertical traverse frame and to said derrick to raise and lower said frame on said derrick; rotary drive power means supported by said vertical traverse frame for vertical movement therewith; means connecting said drill bit to said rotary-drive power means for rotation and vertical movement therewith; a first motor, supported by said base, having a relatively high force-speed ratio; a second motor, supported by said base, having a relatively low force-speed ratio; first drive means, including a clutch, drivably connected to the first motor and to the raising and lowering means, for power lowering said vertical traverse frame with relatively great force and low speed during drilling; second drive means, including a clutch, drivably connected to the second motor and to the raising and lowering means, for power lowering and power raising said vertical traverse frame to and from its drilling position at relatively high speed; and means, including means common to said drive means, interconnecting said motors for selective operation of said motors either independently or in tandem to power lower said vertical traverse frame.

2. In a rotary well-drilling apparatus the combination of: a ground-supported base; a derrick supported by said base; a rotary drill bit adapted to rotate about its vertical axis; a vertical traverse frame; means supporting said frame on said derrick for vertical movement relatively thereto; power means operatively connected to said frame and said derrick to power-raise and power-lower said frame with respect to said derrick; rotary drive power means supported by said frame for vertical movement therewith; means connecting said drill bit to said rotary-drive power means for rotation and vertical movement therewith; further characterized by the fact that the means supporting said frame on said derrick for vertical movement relative thereto includes a pair of vertical gear racks mounted on said derrick and a pair of cooperating pinion gears rotatably mounted on said frame; that the first-mentioned power means is drivably connected to said pinion gears by double-acting drive means; and that the drive means includes a first drum mounted on said frame to rotate about a horizontal axis intersecting the vertical axis of the drill bit and the rotary-drive power means; drive means connecting said first drum to said pinion gears; a second drum supported by the base and driven by the first-mentioned power means; and a pair of cables each oppositely wound on, and anchored at each end to, said drums and reeved on said derrick to rotate said first drum in either direction thereby to power-raise or power-lower said frame on the derrick when said second drum is rotated respectively in a bit-raising or bit-lowering direction by said first-mentioned power means.

3. In a rotary well-drilling apparatus the combination of: a ground-supported base; a derrick supported by said base; a rotary drill bit adapted to rotate about its vertical axis; a vertical traverse frame; means supporting said frame on said derrick for vertical movement relative thereto; power means operatively connected to said frame and to said derrick to power-raise and power-lower said frame with respect to said derrick; rotary drive power means supported by said frame for vertical movement therewith; means connecting said drill bit to said rotary-drive power means for rotation and vertical movement therewith; said first-mentioned power means including a first motor having a relatively-high force-speed ratio to power-lower said frame, and a second independently operable motor having a relatively-low force-speed ratio to power-lower and power-raise said frame; further characterized by the fact that the means supporting said frame on said derrick for vertical movement relative thereto includes a pair of vertical gear racks mounted on said derrick and a pair of cooperating pinion gears rotatably mounted on said frame; that the first-mentioned power means is drivably connected to said pinion gears by double-acting drive means; and that the drive means includes a first drum mounted on said frame to rotate about a horizontal axis intersecting the vertical axis of the drill bit and the rotary-drive power means; drive means connecting said first drum to said pinion gears; a second drum supported by the base and driven by the first-mentioned power means; and a pair of cables each oppositely wound on, and anchored at each end to, said drums and reeved on said derrick to rotate said first drum in either direction thereby to power-raise or power-lower said frame on the derrick when said second drum is rotated respectively in a bit-raising or bit-lowering direction by said first-mentioned power means.

4. A rotary well-drilling apparatus according to claim 3, further characterized by the fact that the drive means includes brake means operatively connected to the vertical traverse frame and to the first drum automatically to set and hold said first drum rigid with respect to said vertical traverse frame when said first drum is actuated by backing up of the drill bit to rotate to raise said vertical traverse frame.

5. A rotary well-drilling apparatus according to claim 3, further characterized by the fact that the drive means includes a driver member operatively connected to said pinion gears and to said first drum to provide opposite driving connections therebetween at spaced points of rotation on said first drum.

References Cited in the file of this patent

UNITED STATES PATENTS

| | | |
|---|---|---|
| 1,371,884 | Focks | Mar. 15, 1921 |
| 2,240,519 | Reed | May 6, 1941 |
| 2,281,952 | Ransome et al. | May 5, 1942 |
| 2,335,079 | Patterson | Nov. 23, 1943 |
| 2,515,366 | Zublin | July 18, 1950 |
| 2,564,188 | Burg et al. | Aug. 14, 1951 |
| 2,594,098 | Vanderzee | Apr. 22, 1952 |
| 2,629,846 | Montgomery et al. | Feb. 24, 1953 |
| 2,643,005 | De Jarnett | June 23, 1953 |
| 2,656,052 | Tucker | Oct. 20, 1953 |